United States Patent
Koteshwara et al.

(10) Patent No.: US 11,675,602 B2
(45) Date of Patent: Jun. 13, 2023

(54) METHODS AND SYSTEMS FOR CREATING ROOT-OF-TRUST FOR COMPUTING SYSTEM COMPONENTS

(71) Applicant: INTERNATIONAL BUSINESS MACHINES CORPORATION, Armonk, NY (US)

(72) Inventors: Sandhya Koteshwara, Yorktown Heights, NY (US); Krishnan Sugavanam, Yorktown Heights, NY (US); Dong Chen, Yorktown Heights, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 2 days.

(21) Appl. No.: 17/443,920

(22) Filed: Jul. 28, 2021

(65) Prior Publication Data

US 2023/0033667 A1    Feb. 2, 2023

(51) Int. Cl.
- *G06F 9/4401* (2018.01)
- *G06F 21/57* (2013.01)
- *G06F 21/60* (2013.01)

(52) U.S. Cl.
CPC .......... *G06F 9/4411* (2013.01); *G06F 21/572* (2013.01); *G06F 21/602* (2013.01); *G06F 2221/033* (2013.01)

(58) Field of Classification Search
CPC ...... G06F 9/441; G06F 21/572; G06F 21/602; G06F 2221/033
See application file for complete search history.

(56) References Cited

U.S. PATENT DOCUMENTS

| | | | |
|---|---|---|---|
| 8,417,774 B2 | 4/2013 | Flynn | |
| 9,930,051 B1* | 3/2018 | Potlapally | H04L 63/126 |
| 10,896,266 B1 | 1/2021 | Beserra | |
| 2002/0194313 A1* | 12/2002 | Brannock | H04L 67/34 717/176 |
| 2003/0236970 A1* | 12/2003 | Palmer | H04L 9/40 719/321 |
| 2017/0344360 A1* | 11/2017 | Jayapaul | G06F 9/442 |
| 2019/0042754 A1* | 2/2019 | Jreij | G06F 21/575 |
| 2020/0042710 A1 | 2/2020 | Liu | |

OTHER PUBLICATIONS

Lambert, Timothy Michael, "Enterprise Platform Systems Management Security Threats and Mitigation Techniques", Report, The University of Texas at Austin, Dec. 2016 (pp. 58).

* cited by examiner

*Primary Examiner* — Jaweed A Abbaszadeh
*Assistant Examiner* — Hyun Soo Kim
(74) *Attorney, Agent, or Firm* — Griffiths & Seaton PLLC

(57) ABSTRACT

Embodiments for managing a computing system are provided. A Root-of-Trust (RoT) device within the computing system is caused to boot. The computing system includes at least one peripheral device, and the RoT device is in operable communication with the at least one peripheral device and a management server. The at least one peripheral device is caused to at least partially boot. The RoT device is caused to retrieve a firmware image associated with the at least one peripheral device from the management server. The at least one peripheral device is caused to reboot utilizing the firmware image.

21 Claims, 6 Drawing Sheets

METHODS AND SYSTEMS FOR CREATING ROOT-OF-TRUST FOR COMPUTING SYSTEM COMPONENTS

BACKGROUND OF THE INVENTION

Field of the Invention

The present invention relates in general to computing systems, and more particularly, to various embodiments for creating Root-of-Trust (RoT) for components of computing systems, such as cloud servers.

Description of the Related Art

Modern cloud computing platforms often include several components with mutable code, such as baseboard management controller (BMCs), central processing units (CPUs), network interface controllers (NICs), accelerators, switches, power supply units, etc. Maintaining the integrity of the mutable code (e.g., firmware for critical components) is a security requirement specified by the National Institute of Standards and Technology (NIST). The concept is termed as "platform firmware resiliency" (PFR) and is based on the existence of a platform Root-of-Trust (RoT).

PFR is generally considered to require the firmware of each component to be in a state of integrity by adhering to the principles of "protect," "detect," and "recover." To satisfy these requirements, corresponding RoTs start, and work together with, chains of trust (CoTs). Although some computing systems (e.g., servers) have hardware RoTs embedded on some components, appropriate RoT/CoT is not present for all components including peripherals. As such, separate, dedicated components, such as application-specific integrated circuits (ASICs) or field programmable gate arrays (FPGAs) are often included to satisfy the requirements of RoT/CoT for some components.

SUMMARY OF THE INVENTION

Various embodiments for managing a computing system, by a processor, are provided. A Root-of-Trust (RoT) device within the computing system is caused to boot. The computing system includes at least one peripheral device, and the RoT device is in operable communication with the at least one peripheral device and a management server. The at least one peripheral device is caused to at least partially boot. The RoT device is caused to retrieve a firmware image associated with the at least one peripheral device from the management server. The at least one peripheral device is caused to reboot utilizing the firmware image.

In addition to the foregoing exemplary embodiment, various other system and computer program product embodiments are provided and supply related advantages. The foregoing Summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
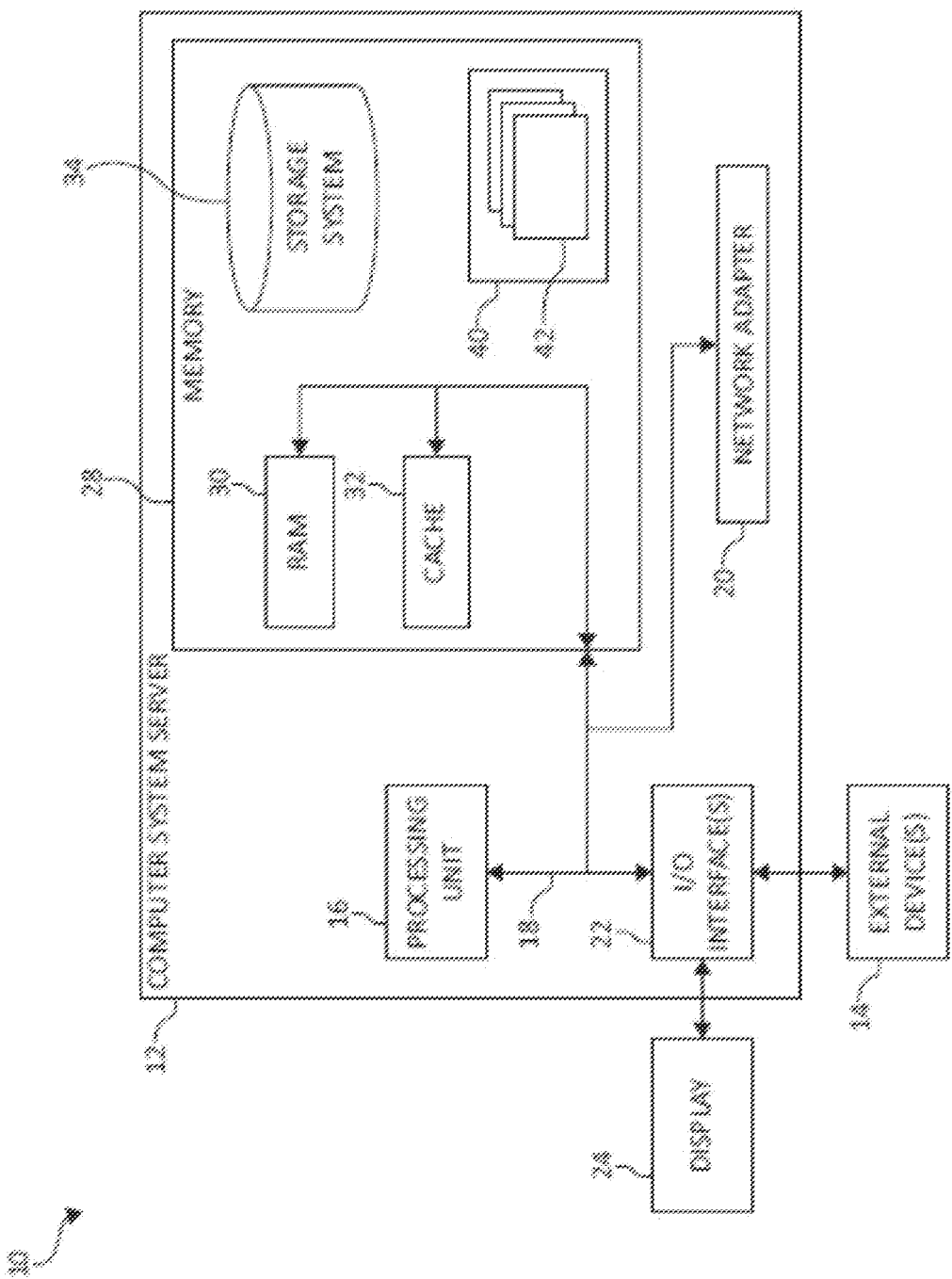
FIG. 1 is a block diagram depicting an exemplary computing node according to an embodiment of the present invention.

As discussed above, modern cloud computing platforms often include several components with mutable code, such as baseboard management controller (BMCs), central processing units (CPUs), network interface controllers (NICs), accelerators, switches, power supply units, etc. Maintaining the integrity of the mutable code (e.g., firmware for critical components) is a security requirement specified by the National Institute of Standards and Technology (NIST). The concept is termed as "platform firmware resiliency" (PFR) and is based on the existence of a platform Root-of-Trust (RoT).

PFR is generally considered to require that the firmware of each component to be in a state of integrity by adhering to the principles of "protect," "detect," and "recover." "Protect" refers to the idea the firmware is always protected from malicious entities and maintained in a state of integrity. "Detect" refers to any corruption in firmware being detected and promptly flagged. "Recover" refers to the existence of recovery mechanisms that can bring a component to a state of integrity in the case of failure or corruption.

To satisfy these requirements, corresponding RoTs start, and work together with, chains of trust (CoTs) fulfill the appropriate security principles. More particularly, platforms typically require RoT/CoT for (or with respect to) "measurement" (i.e., performing measurements of firmware integrity), "storage" (i.e., securely storing the measurements), "reporting" (i.e., securely reporting the measurements to a remote system for attestation/verification), "update" (i.e., securely updating firmware), "detect" (i.e., detecting corruption in firmware), and "recover" (i.e., providing a recovery mechanism and triggering recovery).

Although some computing systems (e.g., servers) have hardware RoTs embedded on some components, appropriate RoT/CoT is not present for all components including peripherals. As such, separate, dedicated components, such as application-specific integrated circuits (ASICs) or field programmable gate arrays (FPGAs) are sometimes included to satisfy the requirements of RoT/CoT for some components. Alternatively, some systems utilize customized components to perform these functions.

More particularly, some prior art systems require RoT chips on peripheral devices and/or ASIC chips interposed between the platform processor and the firmware and/or the ability of the peripheral to measure firmware securely and continue to collect and store the measurements during operation. For example, a conventional system may include an "RoT chip" (e.g., an ASIC) interposed between a central processing unit (CPU), a BMC, a flash device, and a peripheral (e.g., a peripheral that includes firmware and its own RoT). In such a system, when the system is initialized (or booted), the RoT chip may boot first (i.e., utilizing its own RoT) in a secure manner. The RoT chip may then check the flash (i.e., BMC flash), and if appropriate, allow the BMC to boot. The RoT may then query the peripheral to check whether or not the peripheral has booted with trusted firmware (i.e., only peripherals that have passed the check are allowed to boot/stay on). Then, the RoT may check the (CPU) flash and allow the CPU to boot.

Additionally, some prior art systems require the implementation of a protocol to collect measurements from the peripherals, attest the firmware, and continue to allow the device to stay on. However, a true, platform RoT solution that can cover all of the components of the platform does not exist.

To address these needs and/or the shortcomings in the prior art, in some embodiments described herein, methods and/or systems are disclosed that, for example, provide a complete platform RoT that can satisfy PFR principles for all components of the platform, including peripherals. In some embodiments, mechanisms are provided to achieve the RoT for measurement, storage, reporting, protection, detection, and updating for peripherals of the platform, even those with firmware residing inside, for example, a system on chip (SoC) which may not have an RoT of their own. The mechanisms may be based on architectural features of the platform, which may utilize connections to out-of-band (OOB) management ports of the devices (or components), and also involve the boot processes of the devices. The methods and systems described herein provide the platform firmware resiliency requirements even for peripherals with no RoT on them by providing a unique method of booting of peripherals and recording security parameters, as described herein.

More particularly, in some embodiments, a separate RoT on the peripheral is not required, and the platform reflashes verified images of firmware onto peripheral devices each time the peripherals boot (or reboot). As such, the likelihood of peripherals being allowed to boot is increased (if not guaranteed). In some embodiments, the platform RoT (or RoT device or True Platform RoT (TPR)) initializes (or boots, utilizes, etc.) a Trusted Platform Module (TPM), determines (or detects or generates) a measurement of the integrity of the firmware (e.g., a first piece of the firmware), and records (or stores) the measurement on the TPM. As the peripheral boots up, the peripheral continues recording firmware integrity measurements and stores such to the TPM (e.g., the same TPM). Standard methods and hardware may be utilized to interact with the TPM. As such, in some embodiments, no special protocol is required for measurement collection and attestation. The RoT device may include (and/or be implemented utilizing), for example, a BMC and NIC (e.g., a "smart" NIC). In some embodiments, other devices/components may be utilized, which are configured to satisfy PFR and/or all RoT requirements for itself, support multiple OOB management networks to peripherals, provide support for serial buses (e.g., Inter-Integrated Circuit (I2C), serial peripheral interface (SPI), etc.), and have sufficient memory to host virtual TPMs (i.e., in some embodiments). The peripherals utilized/included in the system(s) described herein may include any suitable peripherals, which support OOB networks, allowing for forcibly reflashing firmware, and serial buses, as described below.

In particular, in some embodiments, a method for managing a computing system, by a processor, is provided. A Root-of-Trust (RoT) device within the computing system is caused to boot. The computing system includes at least one peripheral device, and the RoT device is in operable communication with the at least one peripheral device and a management server. The at least one peripheral device is caused to at least partially boot. The RoT device is caused to retrieve a firmware image associated with the at least one peripheral device from the management server. The at least one peripheral device is caused to reboot utilizing the firmware image.

In some embodiments, the RoT device creates a first measurement on a storage device and the at least one peripheral device creates subsequent measurements onto the storage device while rebooting. For example, the RoT device may be caused to generate a first measurement of the integrity of the firmware image associated with the at least one peripheral device. The at least one peripheral may be caused to generate a second measurement of the integrity of the firmware associated with the at least one peripheral device. The first measurement of the integrity of the firmware and the second measurement of the integrity of the firmware may be caused to be stored on at least one storage device.

The at least one storage device may include at least one trusted platform module (TPM). The at least one storage device may include a virtual trusted platform module (vTPM) hosted on the RoT device. The at least one peripheral may be in operable communication with the at least one storage device utilizing a serial communication interface. The RoT device may be in operable communication with the at least one peripheral utilizing an out-of-band (OOB) interface.

The RoT device may include an RoT associated with the RoT device. The RoT may utilize the RoT when the RoT device is caused to boot. The RoT device may include at least one of a baseboard management controller (BMC) and a network interface controller (NIC).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment, such as cellular networks, now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud computing model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors herein) is capable of being implemented and/or performing (or causing or enabling) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, server computer systems, thin clients, thick clients, hand-held or laptop devices, multiprocessor systems, microprocessor-based systems, set top boxes, programmable consumer electronics, network PCs, mobile electronic devices such as mobile (or cellular and/or smart) phones, personal data assistants (PDAs), tablets, wearable technology devices, laptops, handheld game consoles, portable media players, etc., as well as computing systems in (and/or integrated into) vehicles, such as automobiles, aircraft, watercrafts, etc. However, in some embodiments, some of the components depicted in FIG. 1 may be located in a computing device in, for example, a satellite, such as a Global Position System (GPS) satellite. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
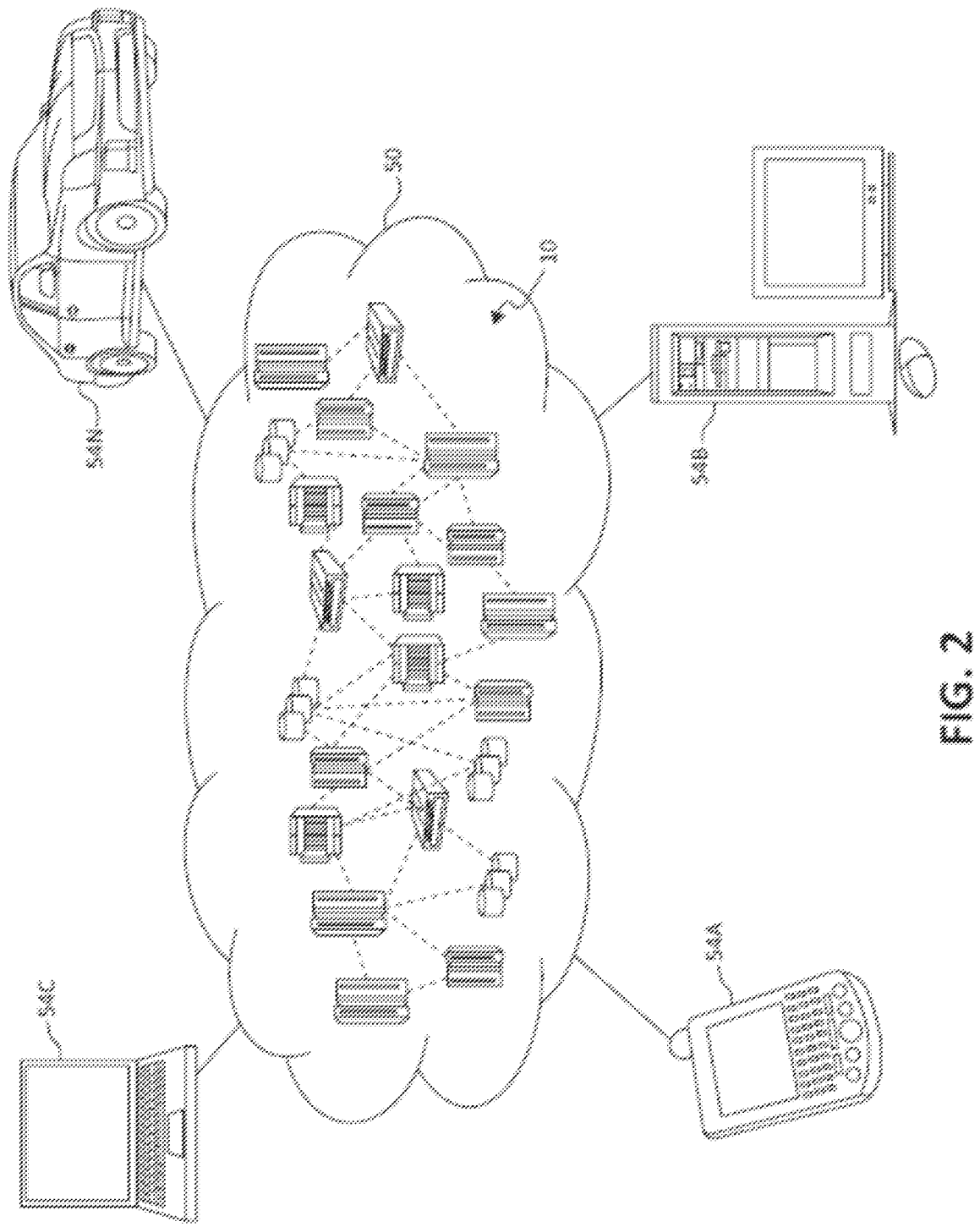
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, cellular (or mobile) telephone or PDA 54A, desktop computer 54B, laptop computer 54C, and vehicular computing system (e.g., integrated within automobiles, aircraft, watercraft, etc.) 54N may communicate.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
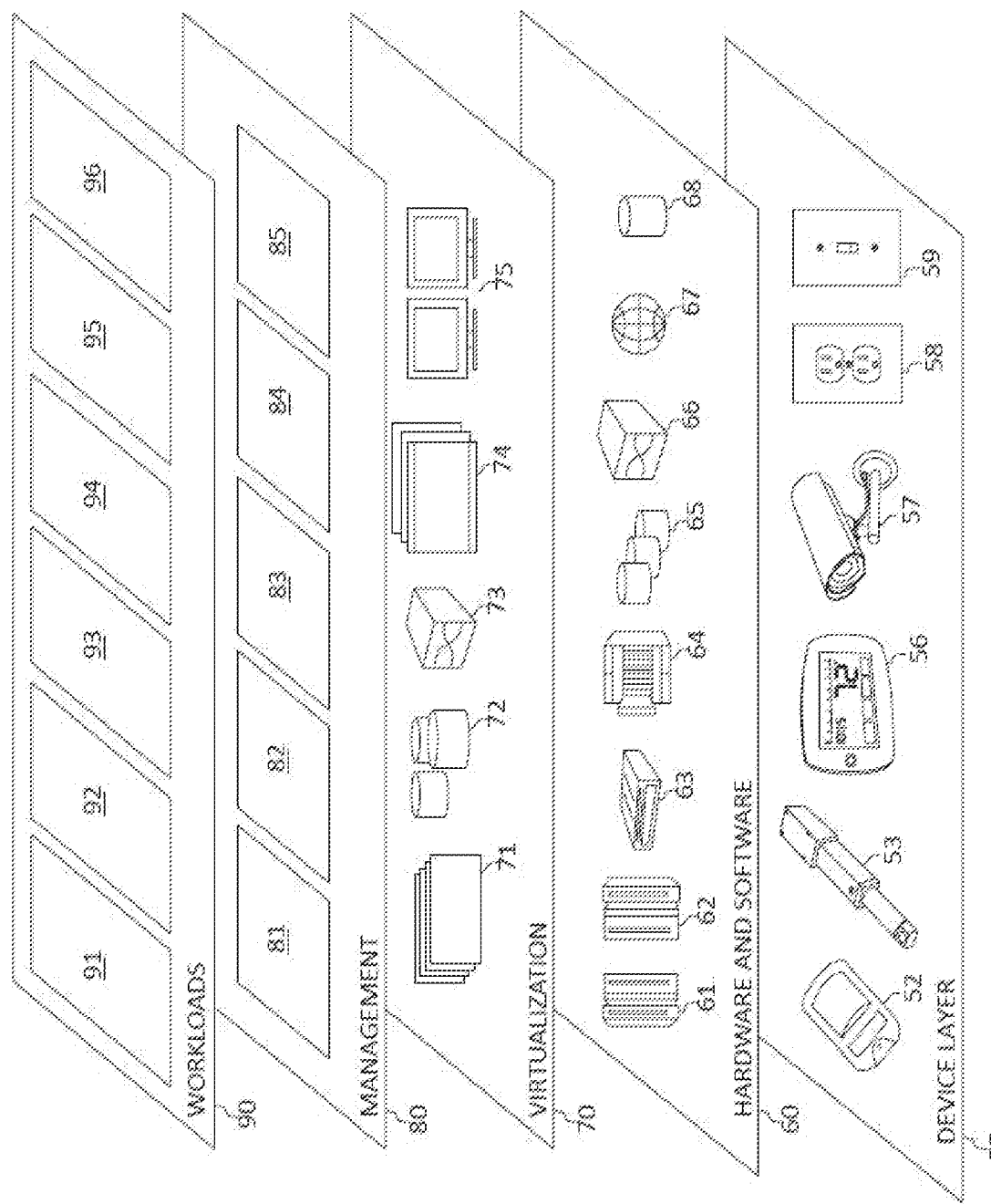
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate. Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, various additional sensor devices, networking devices, electronics devices (such as a remote control device), additional actuator devices, so called "smart" appliances such as a refrigerator, washer/dryer, or air conditioning unit, and a wide variety of other possible interconnected devices/objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for managing computing systems, as described herein. One of ordinary skill in the art will appreciate that the workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, in some embodiments, methods and/or systems are provided that, for example, utilize and/or include a complete platform RoT that may satisfy PFR principles for all components of the platform, including peripherals. In some embodiments, mechanisms are provided to achieve the RoT for measurement, storage, reporting, protection, detection, and updating for peripherals of the platform, even those with firmware residing inside, for example, a system on chip (SoC) which may not have an RoT of their own. The mechanisms may be based on architectural features of the platform, which may utilize connections to out-of-band (OOB) management ports of the devices (or components), and also involve the boot processes of the devices.

More particularly, in some embodiments, a separate RoT on the peripheral is not required, and the platform reflashes verified images of firmware onto peripheral devices each time the peripherals boot (or reboot). As such, peripherals are likelihood of peripherals being allowed to boot is increased (if not guaranteed). In some embodiments, the platform RoT initializes (or boots, utilizes, etc.) a Trusted Platform Module (TPM), determines (or detects or generates) a measurement of the integrity of the firmware (e.g., a first piece of the firmware), and records (or stores) the measurement on the TPM. As the peripheral boots up, the peripheral continues recording firmware integrity measurements and stores such to the TPM (e.g., the same TPM). Standard methods and hardware may be utilized to interact with the TPM. As such, in some embodiments, no special protocol is required for measurement collection and attestation.

Figure 4:
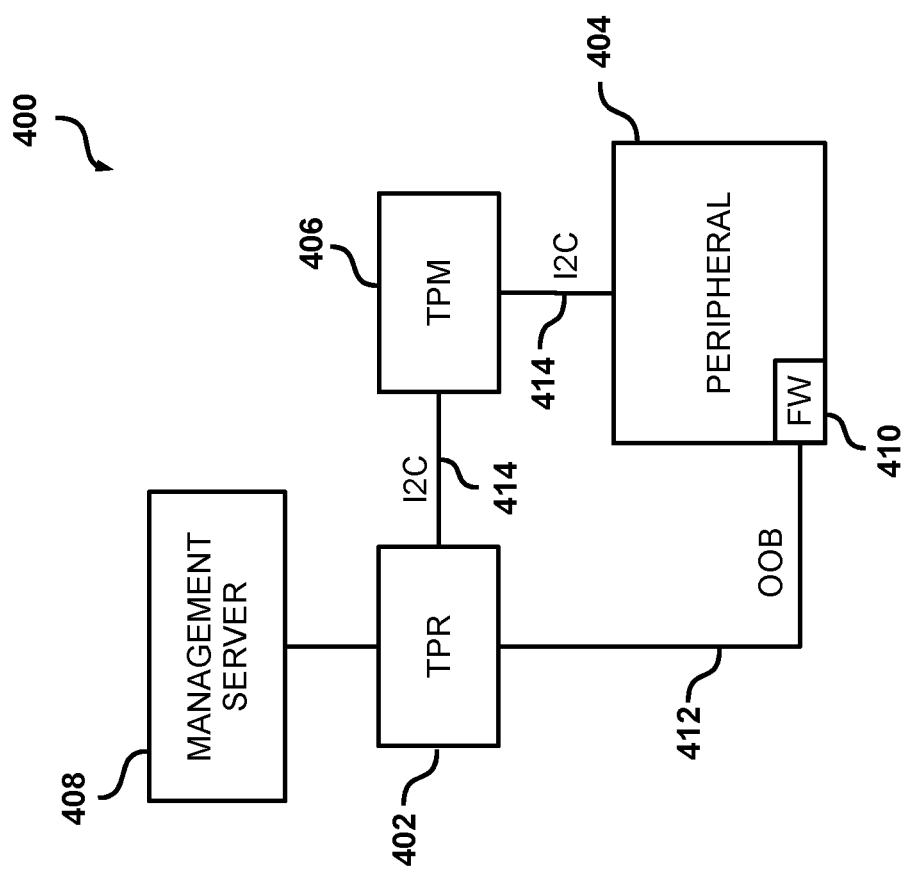
FIG. 4 is a block diagram of a computing system according to an embodiment of the present invention.

FIG. 4 illustrates a simplified computing system (or environment) 400 according to some embodiments described herein. The system includes a RoT device (or True Platform RoT (TPR)) 402, a (or at least one) peripheral (or peripheral device) 404, a TPM 406, and a management server 408. It should be understood that at least some of the components shown in FIG. 4 may be located remotely relative to each other. However, in some embodiments, the TPR 402, the peripheral 404, and the TPM 406 may be located locally, such as within or connected to a server (e.g., a cloud server), as will be appreciated by one skilled in the art, and the management server 408 may be located remotely from the server (and in operable communication therewith via any suitable communications network).

The TPR 402 may be (or include) any device or component (e.g., a processor) that is configured to satisfy PFR and/or all RoT requirements for itself. As such, in some embodiments, the TPR 402 includes and/or has integrated therein an RoT (e.g., an RoT chip). In some embodiments, the TPR 402 is (and/or includes) a BMC or NIC (e.g., a "smart" NIC). The peripheral 404 may include any suitable peripheral device, as is commonly understood. Examples include, but are not limited to switches, FPGAs, NICs, accelerators, power supply units, etc. As shown in FIG. 4, the peripheral 404 includes (or has integrated therein) firmware (FW) 410, as is commonly understood. Although only one peripheral 404 is shown, it should be understood that the methods and systems described herein may be applied to platforms utilizing or including multiple (e.g., two or more) peripherals. In some embodiments, the TPM 406 is (and/or includes) a secure cryptoprocessor configured to secure hardware utilizing cryptographic keys. Although not shown in detail, the TPM 406 may include a processor and one or more memory devices (e.g., a persistent memory and a versatile or volatile memory).

In the embodiment depicted in FIG. 4, the TPR 402 is in operable communication with the peripheral 404 (or more particularly the firmware 410 thereof) through an OOB bus or interface 412. As also shown in the depicted embodiment, the TPR 402, the peripheral 404, and the TPM 406 are in operable communication through an Inter-Integrated Circuit (I2C) interface or bus 414 (or any other suitable communication interface). Although not shown in FIG. 4, it should be understood that the system may include additional components, such as a CPU and CPU flash (e.g., CPU firmware flash or BIOS flash), as are commonly understood.

When the system 400 is initialized (or booted), the TPR 402 may boot first (i.e., utilizing its own RoT) in a secure manner. As such, in embodiments in which the TPR 402 includes a BMC, the BMC may in effect boot first. The boot process for the peripheral may involve creating several RoT/CoT combinations with respect to measurement, storage/reporting, update, detect, and recovery.

The RoT/CoT for measurement may include the peripheral booting in an insecure manner to a state where it may communicate with the TPR 402. In some embodiments, the TPR 402 obtains one or more images of firmware associated with the peripheral 404 from the management server 408. After verifying the firmware, the TPR 402 sends it to the peripheral 404 and reboots it. Measurement of the first stage of firmware may be performed by the TPR 402 and stored on the TPM 406 (or some other memory).

The RoT/CoT for storage and reporting may include the peripheral 404 measuring different stages of its firmware 410 as the peripheral 404 boots up. The measurements may be stored on the TPM 406. The RoT/CoT for update may utilize the TPR 402 being connected to the peripheral 404 through an OOB port. For example, the TPR 402 may periodically (e.g., every few days) check the integrity of the firmware 410 of the peripheral 404 and send updates when appropriate. The RoT/CoT for detect may include the TPR periodically (e.g., every hour) querying the peripheral 404 and its corresponding TPM (e.g., TPM 406) for authentication and/or measurement data to ensure the peripheral is in a secure state.

The RoT/CoT for recovery may include the TPR 402 triggering recovery of the peripheral 404 if the firmware 410 of the peripheral 404 is determined to be corrupt and/or insecure. The TPR 402 may also provide backup or replacement firmware images to the peripheral 404 after verifying the integrity thereof. The TPR 402 may then check the (CPU) flash and allow the CPU to boot.

Figure 5:
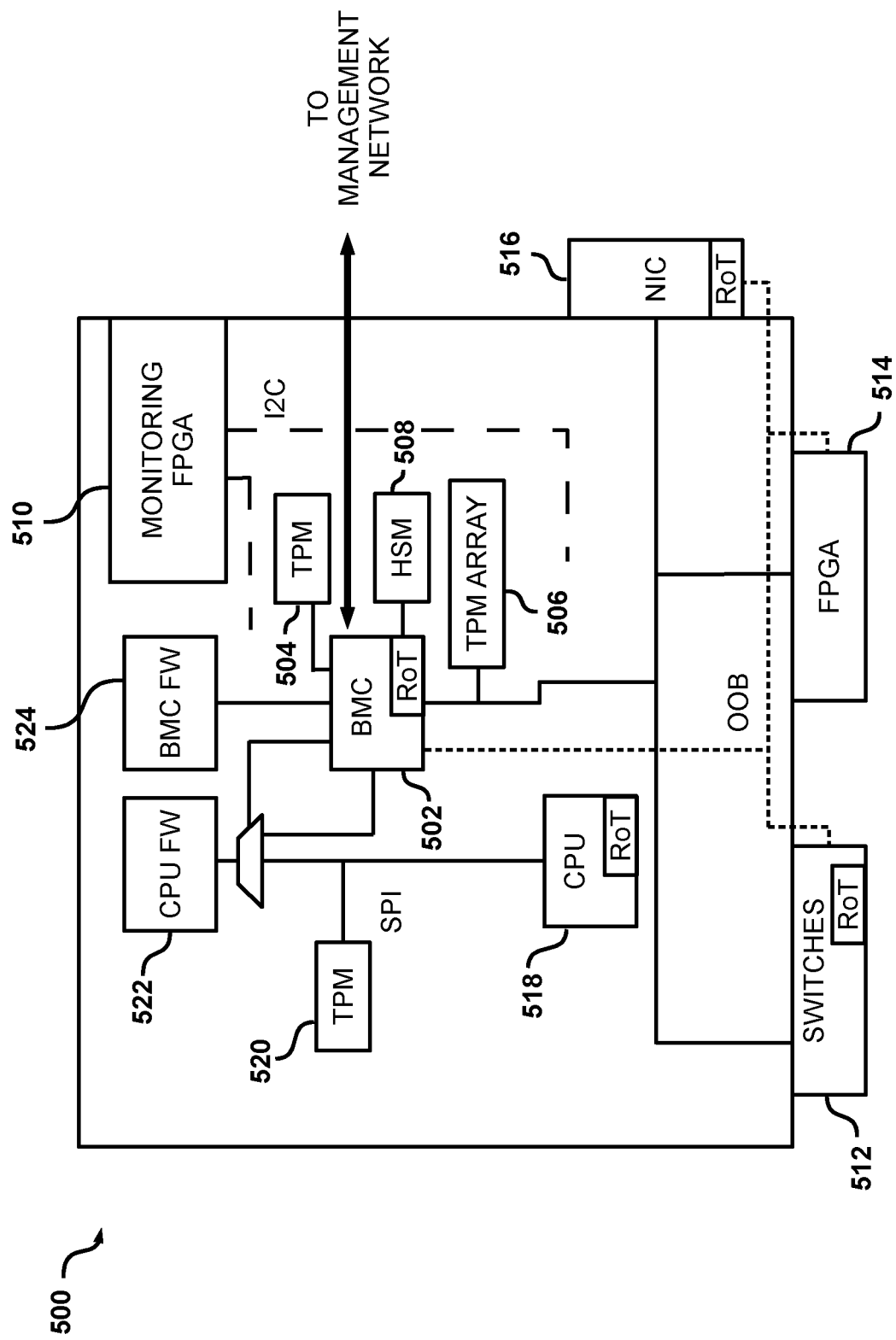
FIG. 5 is a block diagram of a computing system according to an embodiment of the present invention.

FIG. 5 illustrates a computing system (or server or server board) 500 according to some embodiments described herein. In the depicted embodiment, the RoT device is included within a BMC subsystem that may be a modularized portion of the system. The BMC subsystem may include (or be made of) a BMC (having an RoT integrated therein) 502, a (first) TPM 504, a TPM array 506, a hardware security module (HSM) 508, and a (optional) monitoring FPGA 510. The BMC subsystem includes connections to a serial communication network(s) or bus(es) (e.g., I2C and serial peripheral interface (SPI)) and an OOB management network (or bus) of the system 500. In particular, in the depicted embodiment, the BMC 502 is in operable communication with peripheral 512 (e.g., one or more switches with an RoT), peripheral 514 (e.g., an FPGA), and peripheral 516 (e.g., an NIC with an RoT). The monitoring FPGA 510 may, along with the HSM 508, perform monitoring activities and cryptographic functions. The system 500 may also include a CPU (e.g., with an RoT) 518, a (second) TPM 520, CPU firmware 522, and BMC firmware 524, as shown in FIG. 5. It should be understood that at least some of the components shown in FIG. 5 may be located remotely and in operable communication via any suitable communications network.

In some embodiments, virtual TPMs (vTPMs), as will be appreciated by one skilled in the art, may be utilized instead of physical TPMs and exposed to the peripherals. For example, virtual TPMs may be hosted on the BMC processor (or any RoT device) and provide flexibility as different peripherals are added/removed to/from the system 500.

In some embodiments, the RoT device may be implemented with, for example, NICs, such as a "smart" NIC (or smartNIC), as is commonly understood. In such an embodiment, the NIC may be connected (or in operable communication with) the appropriate peripherals of the system to provide measured firmware and provide access to TPMs (or other suitable memory devices) to collect/store measurements. Also, the NIC may be the first component of the system to boot and then maintain the peripherals in a state such that new firmware may be flashed (or loaded) onto them before being rebooted. The NIC may also be in operable communication with a management server, perhaps utilizing an OOB management port.

Figure 6:
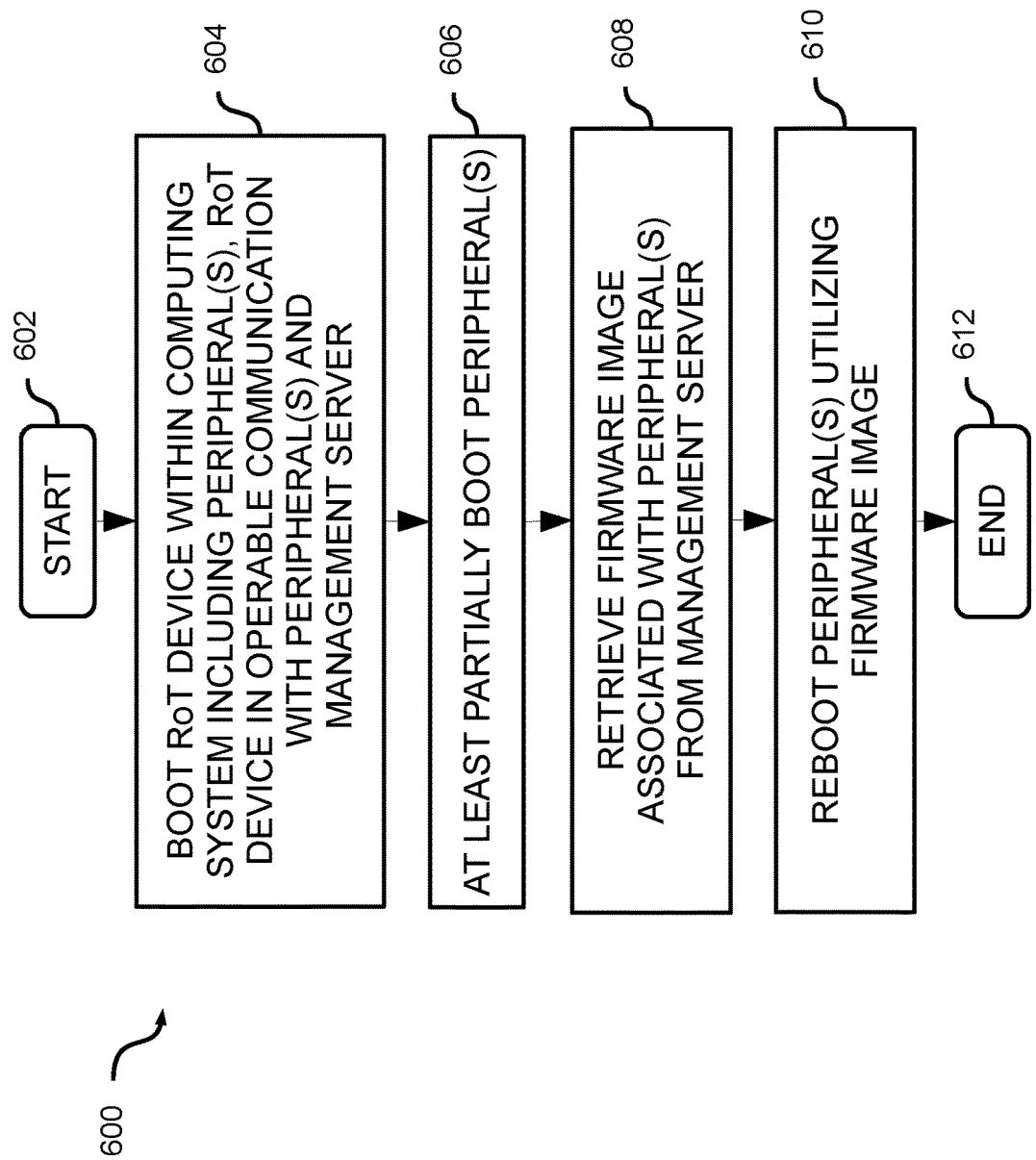
FIG. 6 is a flowchart diagram of an exemplary method for managing a computing system according to an embodiment of the present invention.

Turning to FIG. 6, a flowchart diagram of an exemplary method 600 for managing a computing system (e.g., a cloud server) is provided. The method 600 begins (step 602) with, for example, a computer system, such as a cloud server, being initiated with one or more RoT device (or TPR), at least one peripheral, etc. as described above. It should be noted that in some embodiments at least some of the functionality referred to below and in FIG. 6 may be performed, or caused to be performed, by the RoT device or any other suitable component (e.g., having a processor, access to a memory, etc.).

The RoT device within the computing system is booted (or caused to boot) (step 604). The computing system includes at least one peripheral device, and the RoT device is in operable communication with the at least one peripheral device and a management server. The RoT device is in operable communication with the at least one peripheral utilizing an out-of-band (OOB) interface. The RoT device includes an RoT associated with the RoT device, wherein the RoT device utilizes the RoT when the RoT device boots (or is caused to boot). In some embodiments, the RoT device includes at least one of a baseboard management controller (BMC) and a network interface controller (NIC).

The at least one peripheral device at least partially boots (or such is caused to happen) (step 606). The RoT device retrieves a firmware image associated with the at least one peripheral device from the management server (step 608).

The at least one peripheral device reboots utilizing the firmware image (step 610). The RoT device may generate a first measurement of the integrity of the firmware image associated with the at least one peripheral device. The at least one peripheral may generate a second measurement of the integrity of the firmware associated with the at least one peripheral device. The first measurement of the integrity of the firmware and the second measurement of the integrity of the firmware may be stored on at least one storage device (e.g., including at least one TPM, physical and/or virtual). The at least one peripheral is in operable communication with the at least one storage device utilizing a serial communication interface (e.g., I2C).

Method 600 ends (step 616) with, for example, the peripheral device(s) being booted utilizing verified firmware. As described above, the system may periodically check/recheck such and/or provide updates to the peripheral(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for managing a computing system, by a processor, comprising:
   causing a Root-of-Trust (RoT) device within the computing system to boot, wherein the computing system includes at least one peripheral device, and the RoT device is in operable communication with the at least one peripheral device and a management server;
   causing the at least one peripheral device to at least partially boot;
   causing the RoT device to retrieve a firmware image associated with the at least one peripheral device from the management server, wherein the firmware image associated with the at least one peripheral device is retrieved from the management server each instance of the at least one peripheral device at least partially booting;
   responsive to verifying the firmware image retrieved by the RoT device from the management server, causing the RoT device to send the verified firmware image to the at least one peripheral device; and
   responsive to receiving the verified firmware image from the RoT device, causing the at least one peripheral device to reboot utilizing the firmware image by loading the verified firmware image onto the at least one peripheral device at each reboot of the at least one peripheral device.

2. The method of claim 1, further comprising:
causing the RoT device to generate a first measurement of the integrity of the firmware image associated with the at least one peripheral device;
causing the at least one peripheral to generate a second measurement of the integrity of the firmware image associated with the at least one peripheral device; and
causing the first measurement of the integrity of the firmware image and the second measurement of the integrity of the firmware image to be stored on at least one storage device.

3. The method of claim 2, wherein the at least one storage device includes at least one trusted platform module (TPM).

4. The method of claim 2, wherein the at least one storage device includes a virtual trusted platform module (vTPM) hosted on the RoT device.

5. The method of claim 2, wherein the at least one peripheral is in operable communication with the at least one storage device utilizing a serial communication interface.

6. The method of claim 1, wherein the RoT device is in operable communication with the at least one peripheral utilizing an out-of-band (OOB) interface.

7. The method of claim 1, wherein the RoT device includes at least one of a baseboard management controller (BMC) and a network interface controller (NIC).

8. A system for managing a computing system comprising:
a processor executing instructions stored in a memory device, wherein the processor:
causes a Root-of-Trust (RoT) device within the computing system to boot, wherein the computing system includes at least one peripheral device, and the RoT device is in operable communication with the at least one peripheral device and a management server;
causes the at least one peripheral device to at least partially boot;
responsive to verifying the firmware image retrieved by the RoT device from the management server, causes the RoT device to send the verified firmware image to the at least one peripheral device; and
responsive to receiving the verified firmware image from the RoT device, causes the at least one peripheral device to reboot utilizing the firmware image by loading the verified firmware image onto the at least one peripheral device at each reboot of the at least one peripheral device.

9. The system of claim 8, wherein the process further:
causes the RoT device to generate a first measurement of the integrity of the firmware image associated with the at least one peripheral device;
causes the at least one peripheral to generate a second measurement of the integrity of the firmware image associated with the at least one peripheral device; and
causes the first measurement of the integrity of the firmware image and the second measurement of the integrity of the firmware image to be stored on at least one storage device.

10. The system of claim 9, wherein the at least one storage device includes at least one trusted platform module (TPM).

11. The system of claim 9, wherein the at least one storage device includes a virtual trusted platform module (vTPM) hosted on the RoT device.

12. The system of claim 9, wherein the at least one peripheral is in operable communication with the at least one storage device utilizing a serial communication interface.

13. The system of claim 8, wherein the RoT device is in operable communication with the at least one peripheral utilizing an out-of-band (OOB) interface.

14. The system of claim 8, wherein the RoT device includes at least one of a baseboard management controller (BMC) and a network interface controller (NIC).

15. A computer program product for managing a computing system, by a processor, the computer program product embodied on a non-transitory computer-readable storage medium having computer-readable program code portions stored therein, the computer-readable program code portions comprising:
an executable portion that causes a Root-of-Trust (RoT) device within the computing system to boot, wherein the computing system includes at least one peripheral device, and the RoT device is in operable communication with the at least one peripheral device and a management server;
an executable portion that causes the at least one peripheral device to at least partially boot;
an executable portion that, responsive to verifying the firmware image retrieved by the RoT device from the management server, causes the RoT device to send the verified firmware image to the at least one peripheral device; and
an executable portion that, responsive to receiving the verified firmware image from the RoT device, causes the at least one peripheral device to reboot utilizing the firmware image by loading the verified firmware image onto the at least one peripheral device at each reboot of the at least one peripheral device.

16. The computer program product of claim 15, wherein the computer-readable program code portions further include:
an executable portion that causes the RoT device to generate a first measurement of the integrity of the firmware image associated with the at least one peripheral device;
an executable portion that causes the at least one peripheral to generate a second measurement of the integrity of the firmware image associated with the at least one peripheral device; and
an executable portion that causes the first measurement of the integrity of the firmware image and the second measurement of the integrity of the firmware image to be stored on at least one storage device.

17. The computer program product of claim 16, wherein the at least one storage device includes at least one trusted platform module (TPM).

18. The computer program product of claim 16, wherein the at least one storage device includes a virtual trusted platform module (vTPM) hosted on the RoT device.

19. The computer program product of claim 16, wherein the at least one peripheral is in operable communication with the at least one storage device utilizing a serial communication interface.

20. The computer program product of claim 15, wherein the RoT device is in operable communication with the at least one peripheral utilizing an out-of-band (OOB) interface.

21. The computer program product of claim 15, wherein the RoT device includes at least one of a baseboard management controller (BMC) and a network interface controller (NIC).

* * * * *